(12) United States Patent
Kiss et al.

(10) Patent No.: US 7,680,887 B2
(45) Date of Patent: Mar. 16, 2010

(54) METHOD AND DEVICE FOR MESSAGING

(75) Inventors: Krisztian Kiss, Budapest (HU); Petri Koskelainen, New York, NY (US)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 10/479,936

(22) PCT Filed: May 27, 2002

(86) PCT No.: PCT/IB02/01847

§ 371 (c)(1),
(2), (4) Date: Jul. 2, 2004

(87) PCT Pub. No.: WO02/100066

PCT Pub. Date: Dec. 12, 2002

(65) Prior Publication Data

US 2004/0254992 A1    Dec. 16, 2004

(30) Foreign Application Priority Data

Jun. 6, 2001    (GB)    ................................. 0113763.7

(51) Int. Cl.
*G06F 15/16*    (2006.01)
(52) U.S. Cl. ..................................................... 709/206
(58) Field of Classification Search ................. 709/206
See application file for complete search history.

(56) References Cited

U.S. PATENT DOCUMENTS

| | | | |
|---|---|---|---|
| 6,163,809 A * | 12/2000 | Buckley | 709/206 |
| 6,289,372 B1 * | 9/2001 | Vyaznikov | 709/206 |
| 6,577,622 B1 | 6/2003 | Schuster et al. | 370/352 |
| 6,639,689 B1 | 10/2003 | Kuwahara | 358/1.15 |
| 6,782,414 B1 * | 8/2004 | Xue et al. | 709/206 |
| 2002/0034166 A1 * | 3/2002 | Barany et al. | 370/329 |

FOREIGN PATENT DOCUMENTS

WO    WO 00/65816    11/2000

OTHER PUBLICATIONS

Klensin, John. "Re: Multiple "To:" and "Cc:" header lines in SMTP messages". Sep. 29, 1996. "http://www.imc.org/ietf-smtp/old-archive/msg02387.html".*
Crocker, David. RFC 822. "Standard Format for the Format of ARPA Internet Text Messages". Aug. 1982.*

(Continued)

*Primary Examiner*—Jungwon Chang
(74) *Attorney, Agent, or Firm*—Harrington & Smith

(57) ABSTRACT

A method and system are provided to transmit a message from a transmitting client to a primary receiving client via a server, which is also connected to a secondary receiving client. A message is sent from the transmitting client to the server. The message includes a first header indicative of an address of the primary receiving client and a second header indicative of at least one address of the secondary receiving client and the secondary header being indicative of only a single one of the at least one address. The message is then transmitted from the server to the primary receiving client and from the server to the secondary receiving client.

28 Claims, 1 Drawing Sheet

OTHER PUBLICATIONS

Handley, et al. "RFC 2543: SIP" Mar. 1999, IETF.*
J. Klensin, "Simple Mail Transfer Protocol", IETF Request for Comments, RFC 2821, Apr. 2001, XP002188865 retrieved from Internet at: www.ietf.org/rfc/rfc2821.txt?number=2821.
P. Resnick, "Internet Message Format", IETF Request for Comments, RFC 2822, Apr. 2001, XP002188866, retrieved from Internet at: www.ietf.org/rfc/rfc2822.txt?number=2822.

Rosenberg et al, "SIP Extensions for Instant Messaging", IETF Internet-Draft, Feb. 28, 2001, XP002188864 retrieved from Internet at: URL:http://search.ietf.org/internet-drafts/draft-rosenberg-impp-im-01.txt.
Jonathan Rosenberg, et al., "*SIP Extensions for Instant Messaging*", Internet Engineering Task Force, Dec. 2000.

* cited by examiner

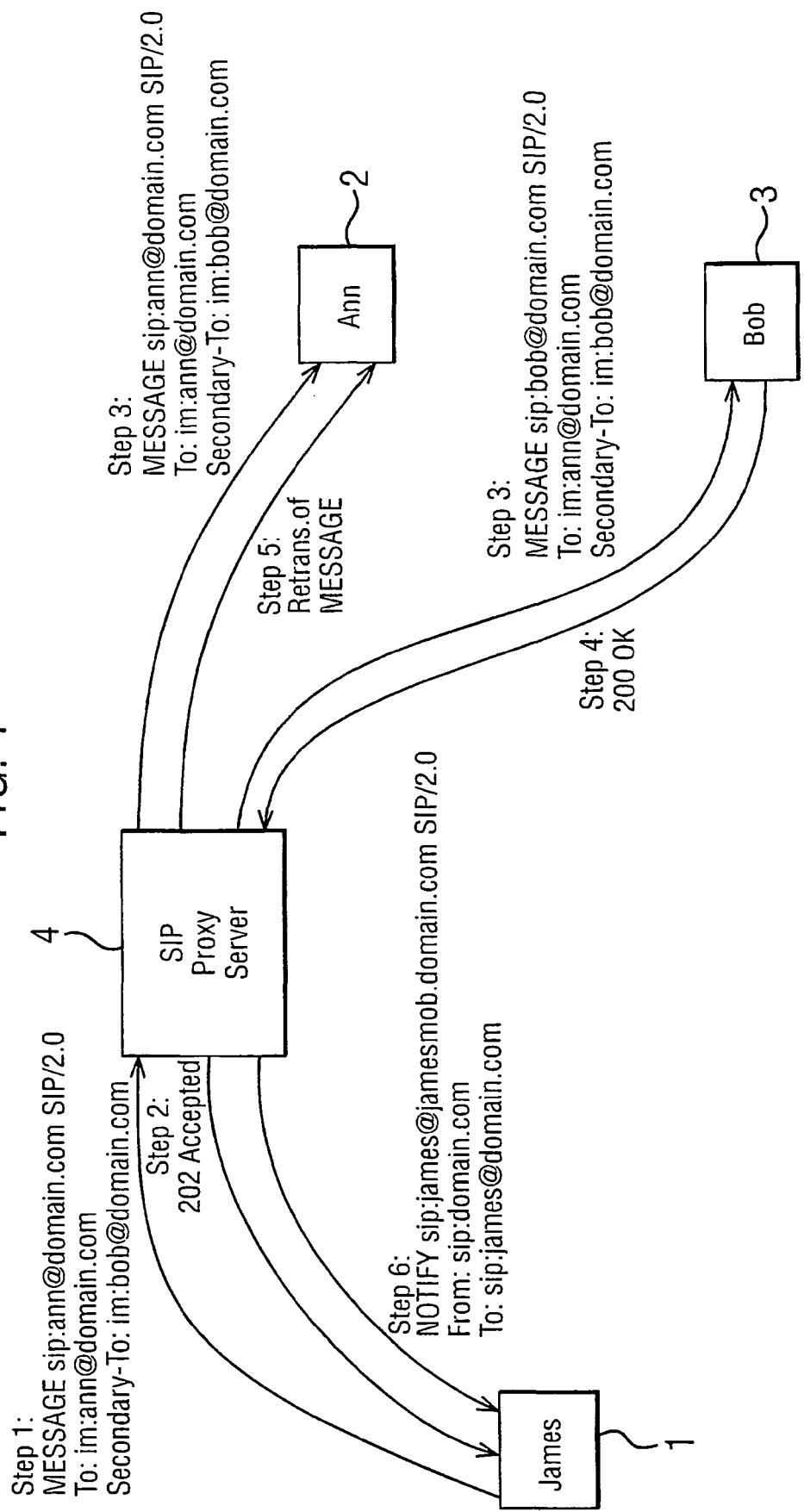

METHOD AND DEVICE FOR MESSAGING

FIELD OF THE INVENTION

The present invention relates to a communication system and method of using such a system to send a message to multiple recipients in a session-based environment.

The invention has been developed primarily for use in internet protocol (IP) based third generation (3G) communication system, preferably by way of modification to the present session initiation protocol (SIP) for session-based communication. However, it will be appreciated that the invention is not limited to use in this field.

BACKGROUND OF THE INVENTION

A communication system can be seen as a facility that enables communication between two or more entities such as user equipment and/or other nodes associated with the system. The communication may comprise, for example, communication of voice, data, multimedia and so on.

A communication system typically operates in accordance with a given standard or specification that sets out what the various elements of the system are permitted to do and how that should be achieved. For example, the standard or specification may define if the user, or more precisely, user equipment or terminal is provided with a circuit switched service and/or a packet switched service. Communication protocols and/or parameters to be used for the connection may also be defined. In other words, a specific set of "rules" on which the communication can be based needs to be defined to enable communication via the system.

Communication systems providing wireless communication for user terminals or other nodes are known. An example of the wireless systems is a cellular network. In cellular systems, a base transceiver station (BTS) or similar access entity serves mobile stations (MS) or similar user equipment (UE) via a wireless interface between these entities. The operation of the apparatus required for the communication can be controlled by one or several control entities. The various control entities may be interconnected. One or more gateway nodes may also be provided for connecting the cellular network to other networks, such as to another cellular system or to a public switched telephone network (PSTN) and/or other communication networks such as an IP (Internet Protocol) and/or other packet switched networks. The communication between the user equipment and the elements of the communication network can be based on an appropriate communication protocol such as the session initiation protocol (SIP).

For example, in the current third generation (3G) multimedia network architectures it is assumed that various servers are used for handling different functions. The SIP is implemented by means of an SIP proxy server. A UE wanting to establish a session with another UE communicates with the SIP proxy server by way of the air interface, and the SIP server then establishes and maintains the required channel.

One difficulty with this arrangement is that if a user wants to use SIP as a basis for sending messages for a group of recipients (such as text messages or data), the message must be sent multiple times from the user to the proxy server, and thence to each intended recipient individually. This consumes bandwidth between the user and the proxy server. The problem is exacerbated in a mobile telecommunications environment, where this link can be the air interface, where bandwidth is at a premium.

Another difficulty is that instant messaging under, for example SIP, does not presently provide an option for users to find out the status of messages they have sent.

SUMMARY OF THE INVENTION

Embodiments of the present invention aim to address one or more of the above problems.

In a first aspect, the present invention provides a method of transmitting a message from a transmitting client to a primary receiving client and at least one secondary receiving client in a communications system including a proxy server, the method including the steps of:

sending the message from the transmitting client to the proxy server, the message including at least a first header indicative of an address of the primary receiving client and at least one secondary header indicative of an address of the at least one secondary receiving client, the primary header being indicative of only a single one of the addresses; and transmitting the message from the proxy server to the primary receiving client and from the proxy server to the at least one secondary receiving client.

In one embodiment, each of the at least one secondary receiving headers is indicative of only a single address of a secondary receiving client.

In an alternative embodiment, the message includes only a single secondary receiving header indicative of addresses of the at least one secondary receiving clients.

Preferably, the method further includes the steps of, in the proxy server:

awaiting a response message from each of the receiving clients, the response message being indicative of successful receipt of the message;

determining, on the basis of any received response messages, which of the receiving clients have received the message; and sending a result message to the transmitting client, indicating which of the receiving clients have received the message.

More preferably, the method preferably includes the step of re-transmitting the message from the proxy server to any receiving clients that do not send a response message within a predetermined time period after transmission of the message from the proxy server.

In a preferred embodiment, the method includes the steps of:

re-transmitting the message up to a predetermined number of times; and in the event that no response message is received, determining that the message transmission was not successful;

wherein the result message indicates those receiving clients that have not received the message.

In a particularly preferred embodiment, the communications system is a telecommunications network and the message is transmitted from the transmitting client to the proxy server over an air interface within the telecommunications network. Most preferably, the proxy server is an SIP proxy server and the message is an SIP message.

In a second aspect, the present invention provides a proxy server for receiving a message sent from a transmitting client addressed to a primary receiving client and at least one secondary receiving client in a communications system, the proxy server being configured to:

receive the message from the transmitting client, the message including at least a first header indicative of an address of the primary receiving client and at least one secondary header indicative of an address of the at least one secondary receiving client, the primary header being indicative of only a single one of the addresses; and transmit the message to the primary receiving client and to the at least one secondary receiving client.

In one embodiment, each of the at least one secondary receiving headers is indicative of only a single address of a secondary receiving client.

In an alternative embodiment, the message includes only a single secondary receiving header indicative of addresses of the at least one secondary receiving clients.

Preferably, the proxy server is configured to:

await a response message from each of the receiving clients, the response message being indicative of successful receipt of the message;

determine, on the basis of any received response messages, which of the receiving clients have received the message; and send a result message to the transmitting client, indicating which of the receiving clients have received the message.

More preferably, the proxy server is configured to re-transmit the message from the proxy server to any receiving clients that do not send a response message within a predetermined time period after transmission of the message from the proxy server.

In a preferred embodiment, the proxy server is configured to:

re-transmit the message up to a predetermined number of times; and in the event that no response message is received, determine that the message transmission was not successful;

wherein the result message indicates those receiving clients that have not received the message.

Preferably, the communications system is a telecommunications network and the message is transmitted from the transmitting client to the proxy server over an air interface within the telecommunications network. Most preferably, the proxy server is an SIP proxy server and the message is an SIP message.

In a third aspect, the present invention provides a communication system for transmitting a message from a transmitting client to a primary receiving client and at least one secondary receiving client, the communications system including a proxy serve according to the second aspect of the invention.

In a fourth aspect, the present invention provides user equipment for transmitting a message to a primary receiving client and at least one secondary receiving client in a communications system including a proxy server, the user equipment being configured to:

send the message to the proxy server, the message including at least a first header indicative of an address of the primary receiving client and at least one secondary header indicative of an address of the at least one secondary receiving client, the primary header being indicative of only a single one of the addresses; and receive a result message from the proxy server, indicating which of the receiving clients have received the message.

In one preferred embodiment, each of the at least one secondary receiving headers is indicative of only a single address of a secondary receiving client.

In an alternative embodiment, the message includes only a single secondary receiving header indicative of addresses of the at least one secondary receiving clients.

Preferably, the result message received by the client is indicative of the proxy server having:

awaited a response message from each of the receiving clients; and determined, on the basis of any received response messages, which of the receiving clients have received the message.

In a preferred form, the communications system is a telecommunications network and the message is transmitted from the user equipment to the proxy server over an air interface within the telecommunications network. More preferably, the proxy server is an SIP proxy server and the message is an SIP message.

BRIEF DESCRIPTION OF DRAWING

A preferred embodiment of the invention will now be described, by way of example only, with reference to the accompanying drawing, which is a schematic of a system for transmitting a message from a transmitting client to a primary receiving client and at least one secondary receiving client.

DESCRIPTION OF PREFERRED EMBODIMENTS OF THE INVENTION

Referring to the drawing, there is shown a system for enabling transmission of a message from a transmitting client in the form of a first mobile telephone 1 (user name "James") to a primary receiving client in the form of a second mobile telephone 2 (user name "Ann") and a secondary receiving client in the form of a computer 3 (user name "Bob"). It will be appreciated that the particular hardware used for the transmitting, primary and secondary clients is not of particular importance to the invention. For example, the transmitting client could be a computer or other form of communications device.

The embodiment shown is implemented at least in part on a mobile telecommunications network, configured to allow (amongst other types of communication) IP communication in accordance with SIP standards. The telecommunications network includes a proxy server 4, which is located on the opposite side of the air interface with respect to the first mobile telephone 1.

James wishes to send a text message to both Ann and Bob. To do so, the message is prepared by any normal means (such as typing using an input keypad). James then selects Ann and Bob as recipients and sends the message via the first mobile telephone 1. The software operating on the mobile telephone 1 formats the message generally in accordance with the SIP standard, placing the destination address of Ann's phone into a primary header in the form of the "To:" field specified by SIP. In this case, Ann's address is ann@domain.com, where "domain" is the domain name of Ann's Universal Resource Locator (URL) address. Domain name addressing is well known to those in internet communications and so will not be described herein in detail.

Under the SIP standard, only one name can be used in the "To:" field. Bob, the second recipient, is addressed by means of a secondary header in the form of a "Secondary-To:" field. As with the "To:" header, only a single address may be entered in the "Secondary-To" field. In this case, Bob's destination address is bob@domain.com.

A copy of the formatted message is now set out:

```
MESSAGE sip:ann@domain.com SIP/2.0
Via: SIP/2.0/UDP jamesmob.domain.com
From: im:james@domain.com
To: im:ann@domain.com
Secondary-To: im:bob@domain.com
Contact: sip:james@jamesmob.domain.com
Call-ID: asd88asd77a@jamesmob.domain.com
Cseq: 1 MESSAGE
Content-Type: text/plain
Content-Length: 10
Come Here.
```

The text message to be delivered is that shown on the last line ("Come here.").

The message is sent by the first mobile telephone 1 to the proxy server 4 via the air interface. It will be appreciated that the message need only be sent once across the air interface, notwithstanding the fact that there are two intended recipients, Ann and Bob. However, in the event that the proxy server does not acknowledge receipt of the message, then the message itself will be retransmitted by the transmitting client several times in accordance with the SIP standard.

The proxy server 4 accepts the message and provides an acknowledgement to the first mobile telephone 1 in the form of a "202 Accepted" response. The proxy server proxies the message according to the original Request-URI and checks to ascertain whether there are any "Secondary-To:" headers containing addresses to which the message should also be sent. In the present case, there is one "Secondary-To" header indicating Bob's address (in the form of Bob's URL). The proxy server 4 therefore also proxies the message request to Bob's address, translating the "Secondary-To" header to a Request-URI.

It will be noted that the communication to Ann includes Ann's URL as the Request-URI of the message, whilst the communication to Bob includes Bob's URL as the Request-URI of that message. This is coordination is undertaken by the proxy server 4 to ensure that the messages are routed correctly in accordance with the SIP standard.

In the example shown, Ann (or specifically, the second mobile telephone 2) does not receive the message upon its initial transmission. This can be for a number of reasons, such as the second mobile telephone being switched off or being out of a mobile coverage area. If the present case, the proxy server attempts retransmission according to the SIP standard. Under that standard, such retransmission will be attempted 11 times. If no acknowledgment of receipt is received from the second mobile telephone after the predetermined number of transmit/wait cycles, then the proxy server assumes that transmission has not been successful.

In Bob's case, the message is received upon first transmission, and the computer 3 transmits a "200 OK" message back to the proxy server indicating successful receipt. Again, "200 OK" is an SIP standard response.

Once the status of all messages is known, the proxy server prepares a result message in the form of a NOTIFY message defined under "Event Notification" procedures in SIP. The NOTIFY message is sent because the original message triggered and implicit subscription at the proxy server. It will be appreciated that a new Event type and a new Content type (delivery report and application/delivery report respectively) must be defined.

The proxy server 4 prepares the following message:

```
NOTIFY sip:james@jamesmob.domain.com SIP/2.0
Via: SIP/2.0/UDP domain.com
From: sip:domain.com
To: sip:james@domain.com
Call-ID: asd88asd77a@jamesmob.domain.com
Cseq: 1 NOTIFY
Event: delivery-report
Content-Type: application/delivery-report
Content-Length: ...
im:ann@domain.com deliveryfailure
im:bob@domain.com deliverysuccess
```

This message is then routed to the first mobile telephone 1, where James can read it. It will be understood that the software running on the first mobile telephone 1 can be configured such that it understands the Content-Type application/delivery-report and formats the message for more user-friendly presentation.

It will be appreciated that any form of communication system that uses a suitable form of addressing can be used. The invention has particular advantages when applied to mobile communications networks, because it reduces the amount of data being sent over the air interface. However, it will be appreciated that the invention can be used in other communications networks, either alone or in conjunction with each other.

The preferred embodiment only deals with the case of two recipients, one being designated a primary recipient and the other a designated secondary recipient. However, it will be appreciated that any number of secondary recipients can be added by simply adding additional "Secondary-To:" headers with the address of each intended recipient. However, in the preferred form each "Secondary-To:" header (and the "To:" header, for that matter) can only have a single address associated with it, and so each additional intended recipient (or, more specifically, recipient address) must have its own associated "Secondary-To:" header.

It will be appreciated that in other embodiments, the "Secondary-To:" can include more than one addressee. Typically, this would be done in the form of a comma or semi-colon separated list. Preferably, if more than one address is allowed in the "Secondary-To:" header, then only one "Secondary-To:" header is allowed.

The preferred embodiment also used addresses that were all within the same domain, for the purposes of simplicity. It will be understood that the addresses in each of the "To:" and "Secondary-To:" headers need not be from the same domain, and that the proxy server can be configured to route messages to other domains in accordance with normal SIP routing procedures. It will also be appreciated that the particular type of addressing used is not critical to implementing the invention.

The use of a modified version of the SIP standard is exemplary only, and any form of instant messaging standard that presently only includes a single address field (usually designated a "To" field) can be modified to operate in this manner.

Also, although the preferred embodiment has been described in terms of a one-off paging context of SIP (modified as described), it can also operate within a session established using that protocol (or any other protocol within which the present invention can be applied).

It will also be understood that addresses include proxy addresses and other forms of aliases. Routing from the proxy server to the various clients involved in any transaction using the invention is preferably undertaken in accordance with standard routing principles. It is the behaviour of the proxy server to determine the addresses to which the messages (and result messages when used) are sent.

The preferred embodiment deals with text messaging. However, it will be appreciated that any form of data can be sent as a payload.

The embodiment of the present invention has been described in the context of third generation (3G) telecommunications systems, such as the Universal Mobile Telecommunication System (UMTS) 3G system. However, it will be appreciated that the invention is also applicable to many other communication systems and protocols, for both radio and landline based communication and combinations thereof. Examples of other systems, without limiting to these, include the General Packet Radio Service (GPRS), the Enhanced Data rate for GSM Evolution (EDGE) mobile data network, other third generation (3G) telecommunication systems such as the i-phone or IMT-2000 (International Mobile Telecommunications) and the Terrestrial Trunked Radio (TETRA) system.

Althought he invention has been described with reference to a specific example and a number of exemplary modifications, it will be appreciated that the invention can be embodied in many other forms without departing from the scope of the present invention defined in the appended claims.

The invention claimed is:

1. A method, comprising:
   receiving a session initiation protocol message from a transmitting client at a session initiation protocol server, the session initiation protocol message including at least a first header indicative of an address of a primary receiving client and at least one secondary header indicative of at least one address of the at least one secondary receiving client, the primary header being indicative of only a single primary receiving client address;
   transmitting the session initiation protocol message from the session initiation protocol server to the address of primary receiving client and from the session initiation protocol server to the address of at least one secondary receiving client;
   awaiting a delivery message, the delivery message being indicative of successful receipt of the message;
   determining, on the basis of any received delivery messages, which of the receiving clients received the message; and
   sending a delivery report to the transmitting client indicating which of the receiving clients received the message.

2. The method according to claim 1, wherein each of the at least one secondary receiving headers is indicative of only a single address of a secondary receiving client.

3. The method according to claim 1, wherein the session initiation protocol message includes only a single secondary receiving header indicative of addresses of the at least one secondary receiving clients.

4. The method according to claim 1, further comprising:
   re-transmitting the session initiation protocol message to the address of any of said receiving clients that do not send the delivery message within a predetermined time period after transmission of the session initiation protocol message.

5. The method according to claim 4, further comprising:
   re-transmitting the session initiation protocol message up to a predetermined number of times; and
   in the event that no delivery message is received, determining that the session initiation protocol message transmission was not successful,
   wherein the delivery report indicates those receiving clients that have not received the session initiation protocol message.

6. The method according to claim 1, wherein the session initiation protocol message is received from the transmitting client over an air interface within a telecommunications network.

7. An apparatus, comprising:
   a receiver configured to receive a session initiation protocol message from a transmitting client, the session initiation protocol message including at least a first header indicative of an address of a primary receiving client and at least one secondary header indicative of at least one address of at least one secondary receiving client, the primary header being indicative of only a single primary receiving client;
   a transmitter configured to transmit the session initiation protocol message to the address of the primary receiving client and to the address of at least one secondary receiving client;
   an awaiting unit configured to await a delivery message, the delivery message being indicative of successful receipt of the session initiation protocol message;
   a client determiner configured to determine, on the basis of any received delivery messages, which of the receiving clients received the session initiation protocol message; and
   a delivery report transmitter configured to send a delivery report to the transmitting client indicating which of the receiving clients received the session initiation protocol message.

8. The apparatus according to claim 7, wherein each of the at least one secondary receiving headers is indicative of only a single address of a secondary receiving client.

9. The apparatus according to claim 7, wherein the session initiation protocol message includes only a single secondary receiving header indicative of addresses of the at least one secondary receiving clients.

10. The apparatus according to claim 7, further comprising:
    a message re-transmitter configured to re-transmit the session initiation protocol message to the address of any of said receiving clients that do not send the delivery message within a predetermined time period after transmission of the session initiation protocol message.

11. The apparatus according to claim 10, further comprising:
    a re-transmitter configured to re-transmit the session initiation protocol message up to a predetermined number of times, and
    in the event that no delivery message is received, a determiner configured to determine that the session initiation protocol message transmission was not successful,
    wherein the delivery report indicates those receiving clients that have not received the session initiation protocol message.

12. The apparatus according to claim 7, wherein the session initiation protocol message is received from the transmitting client over an air interface within a telecommunications network.

13. The apparatus as claimed in claim 7, wherein said apparatus comprises a session initiation protocol server.

14. A system, comprising:
    a session initiation protocol server comprising
        a receiver configured to receive a session initiation protocol message from a transmitting client, the session initiation protocol message including at least a first header indicative of an address of a primary receiving client and at least one secondary header indicative of at least one address of at least one secondary receiving client, the primary header being indicative of only a single primary receiving client, a transmitter configured to transmit the session initiation protocol message to the address of the primary receiving client and to the address of at least one secondary receiving client, an awaiting unit configured to await a delivery message, the delivery message being indicative of successful receipt of the session initiation protocol message, a client determiner configured to determine, on the basis of any received delivery messages, which of the receiving clients received the session initiation protocol message, and a delivery report transmitter configured to send a delivery report to the transmitting client indicating which of the receiving clients received the session initiation protocol message.

15. An apparatus, comprising:

a transmitter configured to send a session initiation protocol message to a session initiation protocol server, the session initiation protocol message including at least a first header indicative of an address of a primary receiving client and at least one secondary header indicative of at least one address of at least one secondary receiving client, the primary header being indicative of only a single primary receiving client; and a receiver configured to receive a delivery report from the session initiation protocol server, indicating which of the receiving clients received the session initiation protocol message.

16. The apparatus according to claim 15, wherein each of the at least one secondary receiving headers is indicative of only a single address of a secondary receiving client.

17. The apparatus according to claim 15, wherein the session initiation protocol message includes only a single secondary receiving header indicative of addresses of the at least one secondary receiving clients.

18. The apparatus according to claim 15, wherein the delivery report is indicative of the session initiation protocol server having awaited a delivery message from each of the receiving clients, and determined, on the basis of any of said received delivery messages, which of the receiving clients received the session initiation protocol message.

19. The apparatus according to claim 15, wherein the session initiation protocol message is transmitted from the apparatus to the session initiation protocol server over an air interface within a telecommunications network.

20. The apparatus according to claim 15, wherein the server is a session initiation protocol.

21. An apparatus, comprising:

means for receiving a session initiation protocol message from a transmitting client, the session initiation protocol message including at least a first header indicative of an address of a primary receiving client and at least one secondary header indicative of at least one address of at least one secondary receiving client, the primary header being indicative of only a single primary receiving client;

means for transmitting the session initiation protocol message to the address of the primary receiving client and to the address of at least one secondary receiving client;

means for awaiting a delivery message, the delivery message being indicative of successful receipt of the session initiation protocol message;

means for determining, on the basis of any received delivery messages, which of the receiving clients received the session initiation protocol message; and means for sending a delivery report to the transmitting client indicating which of the receiving clients received the session initiation protocol message.

22. An apparatus, comprising:

means for sending a session initiation protocol message to a server, the session initiation protocol message including at least a first header indicative of an address of a primary receiving client and at least one secondary header indicative of at least one address of at least one secondary receiving client, the secondary header being indicative of only a single one of the at least one address; and means for receiving a delivery report from the server indicating which of the receiving clients received the session initiation protocol message.

23. The apparatus as claimed in claim 1, wherein said apparatus comprises user equipment.

24. A method, comprising:

sending a session initiation protocol message to a session initiation protocol server, the message including at least a first header indicative of an address of a primary receiving client and at least one secondary header indicative of at least one address of at least one secondary receiving client, the primary header being indicative of only a single primary receiving client; and receiving a delivery report from the session initiation protocol server, indicating which of the receiving clients received the session initiation protocol message.

25. The method according to claim 24, wherein each of the at least one secondary receiving headers is indicative of only a single address of a secondary receiving client.

26. The method according to claim 24, wherein the session initiation protocol message includes only a single secondary receiving header indicative of addresses of the at least one secondary receiving clients.

27. The method according to claim 24, wherein the delivery report is indicative of the session initiation protocol server having awaited a delivery message from each of the receiving clients, and determined, on the basis of any of said received delivery messages, which of the receiving clients received the message.

28. The method according to claim 24, wherein the sending further comprises sending the message to the session initiation protocol server over an air interface within a telecommunications network.

* * * * *